(12) United States Patent
Katz

(10) Patent No.: US 9,675,829 B1
(45) Date of Patent: Jun. 13, 2017

(54) ADJUSTABLE PULL-UP BAR AND CORE EXERCISER

(71) Applicant: Brian Katz, Brooklyn, NY (US)

(72) Inventor: Brian Katz, Brooklyn, NY (US)

(*) Notice: Subject to any disclaimer, the term of this patent is extended or adjusted under 35 U.S.C. 154(b) by 0 days.

(21) Appl. No.: 14/844,847

(22) Filed: Sep. 3, 2015

Related U.S. Application Data

(60) Provisional application No. 62/045,766, filed on Sep. 4, 2014.

(51) Int. Cl.
| | |
|---|---|
| *A63B 1/00* | (2006.01) |
| *A63B 21/00* | (2006.01) |
| *A63B 21/02* | (2006.01) |
| *A63B 21/04* | (2006.01) |
| *A63B 21/068* | (2006.01) |
| *A63B 23/02* | (2006.01) |
| *A63B 23/12* | (2006.01) |

(52) U.S. Cl.
CPC .............. *A63B 1/00* (2013.01); *A63B 21/068* (2013.01); *A63B 23/02* (2013.01); *A63B 23/12* (2013.01); *A63B 23/1218* (2013.01); *A63B 2210/50* (2013.01)

(58) Field of Classification Search
CPC ......... A63B 1/00; A63B 1/005; A63B 21/068; A63B 21/16; A63B 21/4027; A63B 21/4029; A63B 21/055; A63B 21/0552; A63B 23/1218; A63B 23/1227; A63B 23/12; A63B 23/02; A63B 9/18; A63B 1/20; A63B 2210/50; A63B 22/0046; A63B 23/1209; A63B 23/1236; A63B 22/16; A63G 15/02; A63G 15/00; A47D 13/10
See application file for complete search history.

(56) References Cited

U.S. PATENT DOCUMENTS

| | | | | |
|---|---|---|---|---|
| 1,905,112 | A * | 4/1933 | Lang ...................... | A01D 46/20 482/75 |
| 2,817,522 | A * | 12/1957 | Margulies .............. | A63B 17/00 482/145 |

(Continued)

FOREIGN PATENT DOCUMENTS

| | | |
|---|---|---|
| WO | WO2006014964 | 2/2006 |
| WO | WO2009109793 | 9/2009 |

*Primary Examiner* — Loan H Thanh
*Assistant Examiner* — Nyca T Nguyen
(74) *Attorney, Agent, or Firm* — Goldstein Law Offices, P.C.

(57) ABSTRACT

An adjustable pull-up device for use as part of a comprehensive fitness routine, including upper body and core strengthening, and balance training. The device transitions easily between traditional and modified fitness training exercises. The device includes a pair of support mechanisms and a bridge extending therebetween. The pair of support mechanisms each include at least one expandable leg. When the device is deployed, the legs selectively expand and contract for performing exercises, such as a pull-up, when the user lies between the legs. In an example embodiment, the device includes tripod legs for added stability of the device. In another example embodiment, the legs are pivotally coupled to the bridge to enable the collapsibility and storage of the device. The device can include a plurality of hooks for coupling supplementary fitness equipment to further enable variable forms of fitness training.

5 Claims, 17 Drawing Sheets

(56) References Cited

U.S. PATENT DOCUMENTS

| | | | | |
|---|---|---|---|---|
| 3,475,020 | A | * | 10/1969 | Schauerte ............... A63B 22/16 |
| | | | | 482/146 |
| 4,804,064 | A | * | 2/1989 | Coultrup ................. B25H 1/06 |
| | | | | 182/155 |
| 5,290,209 | A | * | 3/1994 | Wilkinson ....... A63B 21/00047 |
| | | | | 482/121 |
| 5,547,443 | A | * | 8/1996 | Chen .................... A63B 21/068 |
| | | | | 482/121 |
| 5,954,156 | A | * | 9/1999 | Cooke ................... B25H 1/06 |
| | | | | 182/153 |
| 6,203,473 | B1 | | 3/2001 | Atwood |
| 6,564,903 | B2 | * | 5/2003 | Krajec .................... B25H 1/06 |
| | | | | 182/153 |
| 6,692,417 | B2 | | 2/2004 | Burrell |
| 7,364,530 | B2 | | 4/2008 | Lopez |
| 7,658,699 | B1 | * | 2/2010 | Johnson, Jr. ......... A63B 69/201 |
| | | | | 482/83 |
| 7,682,298 | B2 | | 3/2010 | Croft |
| 8,079,915 | B2 | * | 12/2011 | Spencer .................. A63G 9/00 |
| | | | | 472/118 |
| 8,267,840 | B2 | | 9/2012 | Barnes |
| 8,317,664 | B2 | | 11/2012 | Gorsuch et al. |
| 8,961,374 | B2 | * | 2/2015 | Davidow ......... A63B 21/00054 |
| | | | | 482/142 |
| 2002/0082145 | A1 | | 6/2002 | Hamilton |
| 2005/0130806 | A1 | * | 6/2005 | Lopez ............. A63B 21/00047 |
| | | | | 482/38 |
| 2012/0085380 | A1 | * | 4/2012 | Buckley .................. E04H 15/46 |
| | | | | 135/140 |
| 2013/0237394 | A1 | | 9/2013 | Fowler |

\* cited by examiner

ADJUSTABLE PULL-UP BAR AND CORE EXERCISER

CROSS REFERENCES AND RELATED SUBJECT MATTER

This application is a non-provisional filing of provisional patent application Ser. No. 62/045,766, filed in the United States Patent Office on Sep. 4, 2014.

TECHNICAL FIELD

The present disclosure relates generally to fitness equipment. More particularly, the present disclosure relates to an adjustable pull-up and core exerciser device.

BACKGROUND

The health benefits of physical exercise are widely known. A pull-up bar is traditionally used for a variety of upper-body and core exercises wherein a user lifts at least their own bodyweight. Such movement promotes muscle development, specifically that of the arms, core, and back. However, when the user is not properly trained in the use of the pull-up bar, serious injury can result. Further, a novice and/or an intermediate user is often unable to lift his or her own bodyweight to complete a full pull-up, resulting in further injury when a pull-up is improperly attempted.

As a result, the typical user will often modify the pull-up exercise using fitness devices that are currently marketed. Some of these devices include both large units of weight equipment and small devices intended to build strength within the targeted muscle groups.

Nevertheless, the user is often inconvenienced by drawbacks that are frequently associated with the home use of such devices, such as bulkiness, lack of durability, and a limited exercise range. Further, this strength training equipment is often very expensive to purchase for home use and therefore, inaccessible to many people.

For instance, one such device includes a pull-up bar and a pair of grips which secure to a door frame for the user to do a pull-up in the doorway. However, such device is often not sufficiently anchored around the door frame. As a result, the device typically collapses from the door frame with the user suspended therefrom, injuring the user when the device falls to the ground. Further, the collapsing device often causes costly property damage to the door frame and home. Yet further, because the device is typically positioned over and around the top of the door frame, the user is often unable to perform a modified pull-up wherein less than all their bodyweight is lifted.

Yet further, existing pull-up devices are often not easily tailored to any single user's arm length, height, or skill level. Resultantly, the user often suffers an injury, such as shoulder pain or dislocation, when performing the pull-up improperly.

Still further, the pull-up devices found in a gym setting are not easily used within the home due to the bulkiness and weightiness of the devices. Additionally, the user is often unaware of where gyms are located when traveling. As a result, the user often enlists the services of a personal trainer who can visit the user's home or hotel room. Although some portable pull-up devices have been developed to accommodate the frustrated user, such devices are similarly associated with bulkiness and a limited range of exercise. Both the user and the personal trainer could benefit from having a pull-up fitness device that is easily portable, compatible with modified pull-up regimens, comprised of minimal components, and which can enable a wide range of exercises.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment is to provide a pull-up device which can be used as a portable, comprehensive fitness solution. Accordingly, an aspect of an example embodiment in the present disclosure provides a pull-up device including a pair of collapsible legs.

Another aspect of an example embodiment is to provide an adjustable pull-up device which transitions easily between different heights for use within variable forms of fitness training. Accordingly, an aspect of an example embodiment in the present disclosure provides a pull-up device including a pair of adjustable legs which can be selectively extended and contracted for performing exercises of variable intensity.

A further aspect of an example embodiment is to provide a pull-up device which enables an array of hand gripping positions by a user for performing modified fitness exercises, especially for allowing a variety of pull-up positions. Accordingly, an aspect of an example embodiment in the present disclosure provides a pull-up device including an adjustable bridge, such as a cross bar, extending between the pair of legs for selectively targeting different muscle groups depending on the placement of a user's hands when exercises are performed.

Yet a further example embodiment is to provide a pull-up device which is sufficiently anchored to a surface when a user exerts force onto the cross bar. Accordingly, an aspect of an example embodiment in the present disclosure provides the pull-up device including a pair of tripod legs for stabilizing the device against a surface when the device is deployed thereon.

Still a further aspect of an example embodiment is to provide the telescoping legs and the cross bar each configured for use with supplemental exercise devices. Accordingly, an aspect of an example embodiment in the present disclosure provides the legs and the cross bar, each including a plurality of openings and an associated plurality of hooks for coupling supplemental exercises devices to enable loaded movement across a user's body while fitness training. Further, the user can operatively replace the cross bar with an exercise band for added resistance when using the device to perform fitness exercises, such as crunches.

Accordingly, the present disclosure describes an adjustable pull-up device. The device is used as part of a comprehensive fitness routine, including upper body and core strengthening, and balance training. The device transitions easily between traditional and modified fitness training exercises, enabling a user to perform fitness exercises of varying degrees of difficulty. In an example embodiment, the device includes a bridge extending between a pair of adjustable legs when deployed against a surface. The legs selectively contract for performing exercises, such as a pull-up, when the user lies on the surface between the legs. In another example embodiment, the device includes tripod legs for added stability of the device when deployed. The legs are pivotally coupled to the bridge to enable the collapsibility and storage of the device when not in use. The device can include a plurality of hooks for coupling supplemental fitness equipment to further enable variable forms of fitness training.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
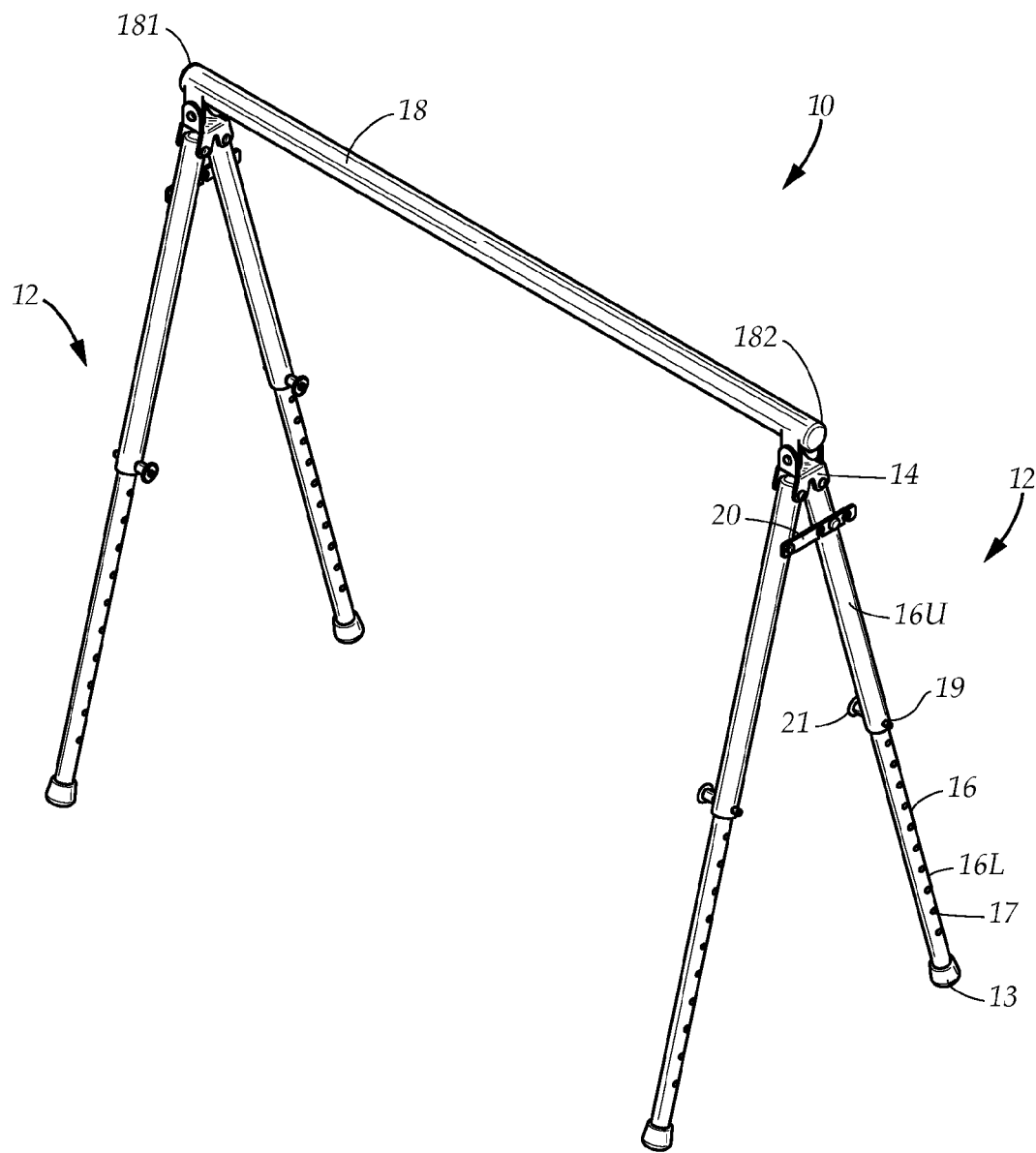
FIG. 1 is a perspective view of an example embodiment of an adjustable pull-up device including a pair of extendable legs.
Figure 4:
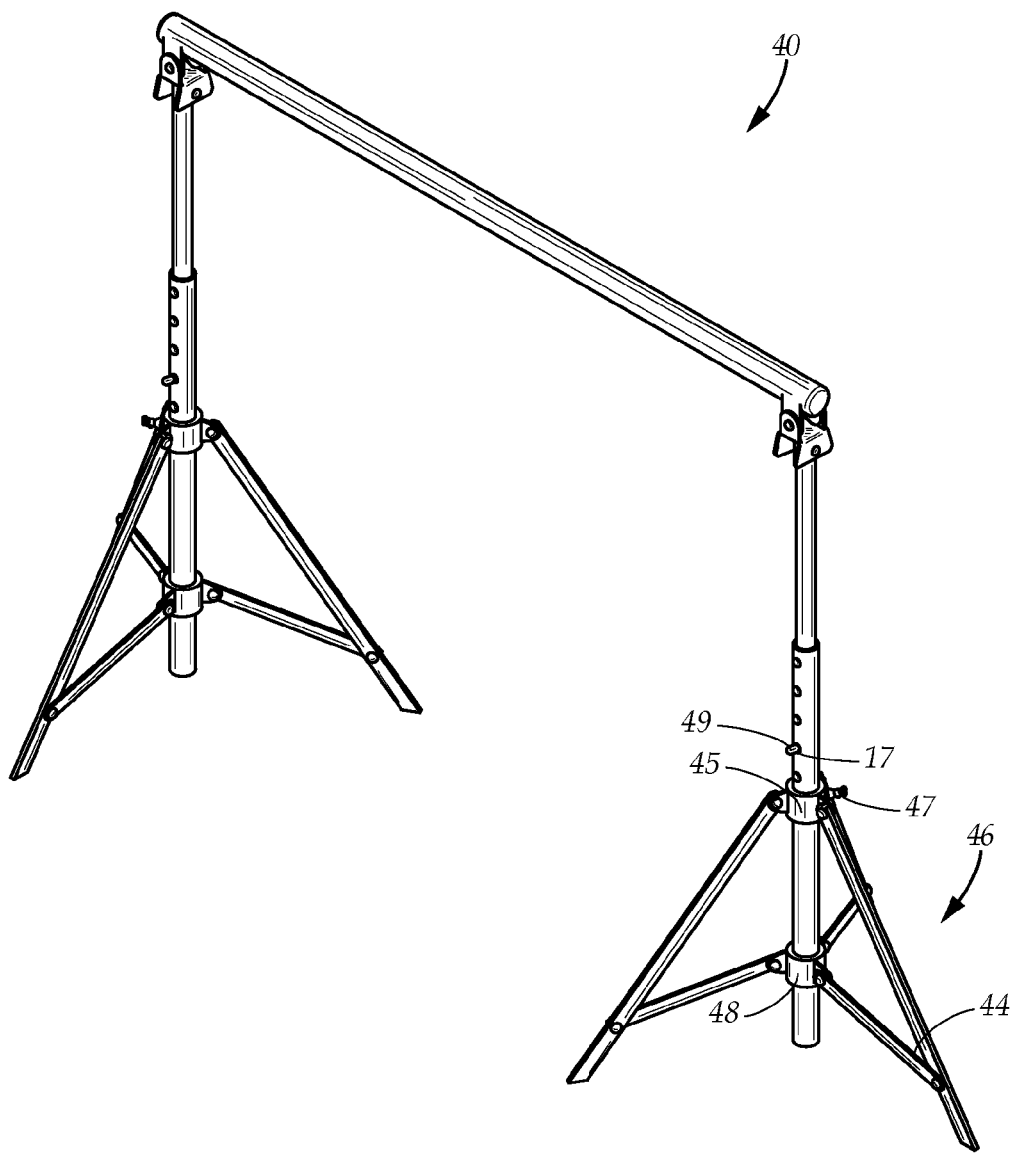
FIG. 4 is a perspective view of another example embodiment of an adjustable pull-up device including tripod legs.

FIG. 1 illustrates an adjustable pull-up device 10 used to perform a comprehensive fitness routine including, but not limited to, strength and balance training. The adjustable pull-up device 10 includes a pair of support mechanisms 12 and a bridge 18 extending between each support mechanism 12. The bridge 18 is a cylindrical bar that has a pair of ends 181, 182, with one of the support mechanisms attached at each of the ends. Each support mechanism 12 includes at least one expandable leg 16. FIG. 1 illustrates an example embodiment of the support mechanisms 12, each including a pair of expandable legs 16 which prop up the device 10 over a horizontal surface with the bridge extending substantially parallel to the horizontal surface. Each support mechanism 12 can collapse towards the bridge 18 via a hinge 14 to enable the portability of the device 10. Further, the expandable legs 16 enable a user to easily transition between traditional and modified fitness training exercises, particularly a pull-up. Accordingly, the user selectively contracts the legs 16 for performing a pull-up of less than the user's total body weight when the user lies between the legs 16. In an example embodiment, the bridge 18 is expandable for adapting the device 10 to a user's size and fitness level. In another example embodiment, the device 40 includes tripod legs 46 for added stability of the device 40 when deployed against a surface, as illustrated in FIG. 4. In a further example embodiment, the legs 16 and the bridge 18 are configured for use with supplementary exercise devices, such as exercise bands.

Figure 2A:
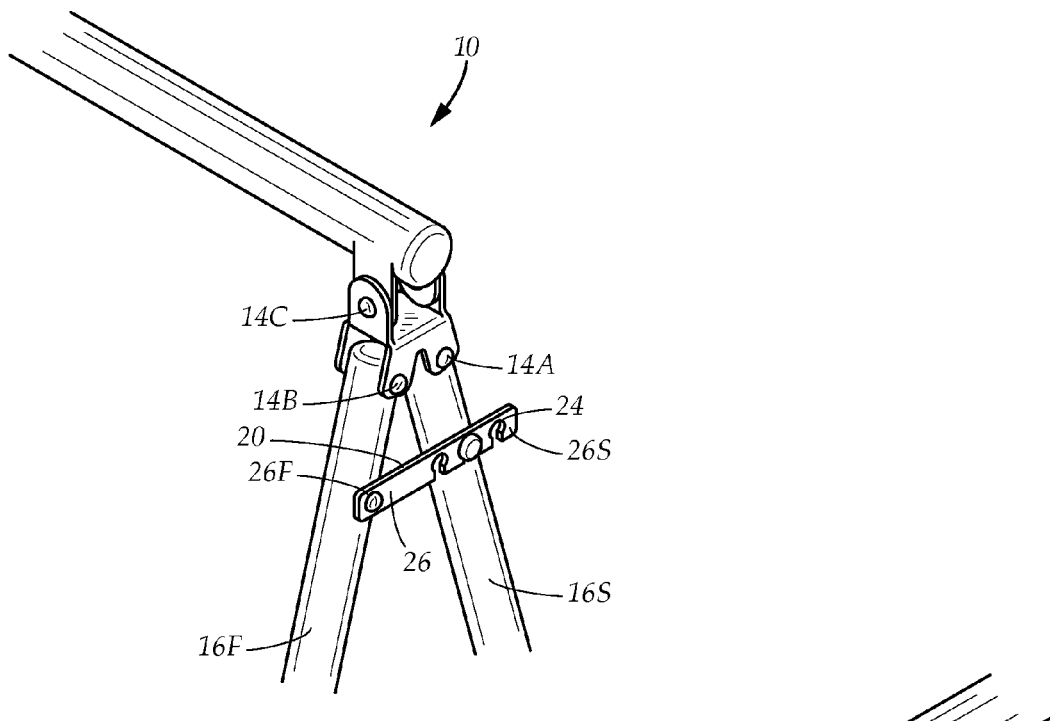
FIG. 2A is a perspective, enlarged view of an example embodiment of the extendable legs including a locking mechanism.

FIG. 1 illustrates an example embodiment of a deployed pull-up device 10 including the pair of support mechanisms 12 and the bridge 18 extending therebetween via a pair of hinges 14. Each hinge 14 includes a plurality of joints 14A-14C, as illustrated in FIG. 2A. Each pair of expandable legs 16 extends downwardly from a hinge 14, forming an inverted V-shape over a surface upon which the device 10 is deployed. Further, one leg 16 pivots around the joint 14A and the other leg pivots around the joint 14B, to selectively deploy and collapse the device 10, as illustrated in FIG. 2A.

Figure 2B:
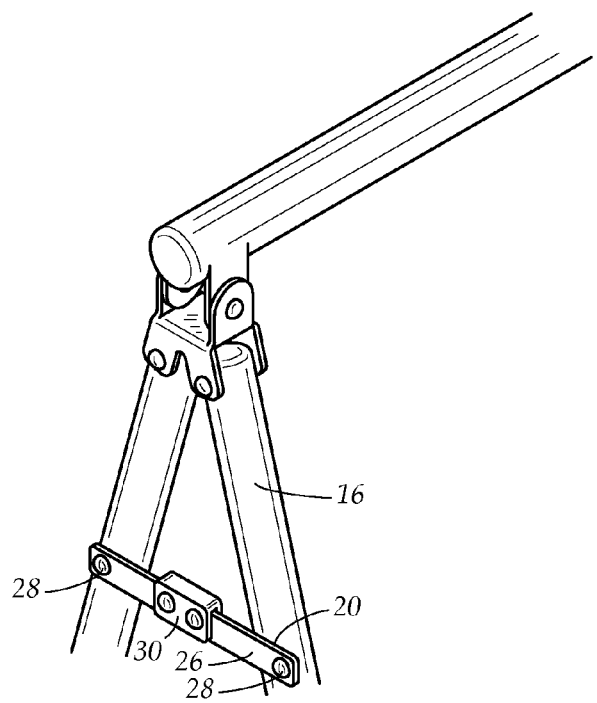
FIG. 2B is a perspective, enlarged view of the extendable legs including another example embodiment of the locking mechanism.

Each of the support mechanisms 12 further includes a retainer 20 for securing the legs 16 in a deployed position. In FIG. 2A, an example embodiment of the retainer 20 includes a pivoting latch 26 including a first end 26F pivotally coupled to a first leg 16F of the support mechanism 12, and a second end 26S. The second end 26S includes a plurality of teeth 24 for coupling to a pin 22 included on a second leg 16S of the support mechanism 12. FIG. 2A further illustrates how the teeth 24 of the latch 26 fasten around the pin 22. When deploying the device 10, the user adjusts the height of the device 10 by pivoting the legs 16 of the support mechanisms 12 towards or away from each other, and fastening the latch 26 in place around the associated pin 22 to secure the device 10 in the deployed position. FIG. 2B illustrates another example embodiment of the retainer 20 including a latch 26 having a length and a pair of ends 28, each end 28 operatively coupled to a leg 16 of the support mechanism 12, and a clasp 30 extending along the length. When deploying the device 10, the user adjusts the height of the device 10 as described hereinabove, and slides the clasp 30 along the length to secure the device 10 in the deployed position. However, it is understood that the retainer 20 is not necessary to secure the device 10 in the deployed position.

FIG. 1 further illustrates an example embodiment of the expandable legs 16 of the device 10. In an example embodiment, the legs 16 have a length, an upper portion 16U, and a lower portion 16L. The legs 16 are telescoping such that at least one of the upper portion 16U and the lower portion 16L contract into the other when collapsing the device 10. In FIG. 1, the lower portion 16L of the legs 16 includes a plurality of vertically aligned apertures 17. The upper portion 16U includes at least one aperture 19. The lower portion apertures 17 are configured for alignment with the aperture 19 in the upper portion 16U of the legs 16. A fastener 21 is operatively inserted through the aligned apertures 17,19 for securing the legs 16 in an expanded or a contracted position. The fastener 21 can be a pin, as illustrated in FIG. 1. However, it is understood that the fastener 21 can also include, but is not limited to, bolts, screws, dowels, bars, locks, and pegs. Additionally, the lower portion 16L of the legs 16 can include a gripper foot 13 for better stabilizing the device 10 against a surface when the device 10 is deployed. Alternatively, the lower portion 16L of the legs 16 can include a selectively removable wheel for added mobility of the device 10 over a surface.

In a further example embodiment of the expandable legs 16, each of the upper portion 16U and the lower portion 16L has a first end and a second end. The second end of the upper portion 16U is pivotally coupled to the first end of the lower portion 16L such that the lower portion 16L can pivot away from and towards the hinge 14 of the support mechanisms 12 for deploying and collapsing the device 10, respectively. In yet a further example embodiment of the expandable legs 16, the upper portion 16U of the legs 16 includes a track within which the lower portion 16L selectively slides away from and towards the hinge 14 of the support mechanisms 12 for deploying and collapsing the device 10, respectively. In both embodiments, a fastener 21 can be inserted to secure the legs 16 in an expanded or a contracted position.

FIG. 4 illustrates yet a further example embodiment of the pull-up device 40 including a pair of expandable tripod legs 46. In this embodiment, a plurality of branches 44 extend outwardly from a collar 45 extending around the expandable legs 16, towards a surface when the device 40 is deployed. The collar 45 includes a fastener 47 for prohibiting the collar 45 from rolling haphazardly along the leg 16 when the device 40 is in use. Further, each tripod leg 46 includes a lockable spreading mechanism 48 for prohibiting the branches 44 from expanding past a certain angle of rotation from the expandable legs 16 when deployed. The lower portion 16L of the legs 16 include a plurality of vertically aligned apertures 17. The upper portion 16U of the legs 16 includes a retractable peg 49 configured for projecting through an aperture 17 in the lower portion 16L of the leg 16 when it is expanded or contracted, and the peg 49 is aligned with the aperture 17.

Figure 6:
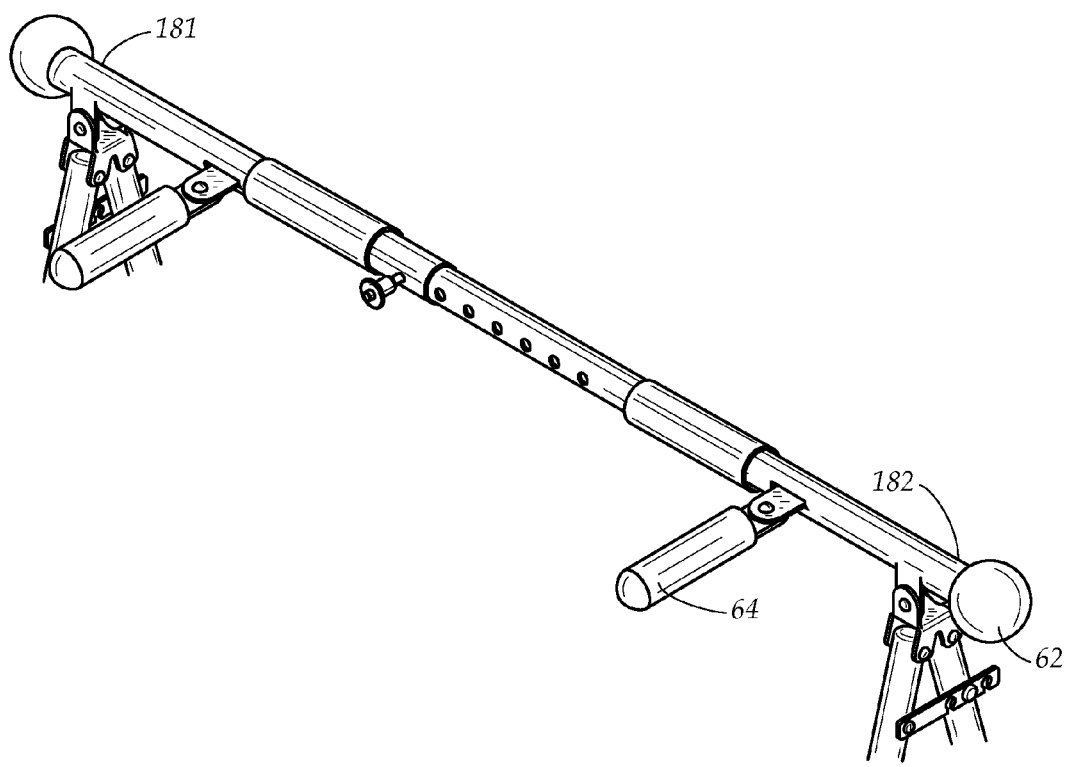
FIG. 6 is a perspective, enlarged view of the adjustable bridge including a pair of pivoting handles.

Referring back to FIG. 1, the device 10 includes the bridge 18, having a length extending between the ends 181, 182, where each support mechanism 12 is located. The bridge 18 extends substantially horizontally over a surface over which the device 10 is deployed. In an example embodiment illustrated in FIG. 2A, the ends are each operatively coupled to a third pivoting joint 14C included within each hinge 14 of the support mechanisms 12. In another example embodiment, the bridge 18 is selectively removable from the third joints 14C, and therefore from the support mechanisms 12. Accordingly, the bridge 18 can include at least one weight 62 for use of the bridge 18 as a free weight when the bridge 18 is removed from within the third joints 14C of the hinges 14, and preferably includes a pair of weights, one located at each of the ends 181, 182, as illustrated in FIG. 6.

Figure 5:
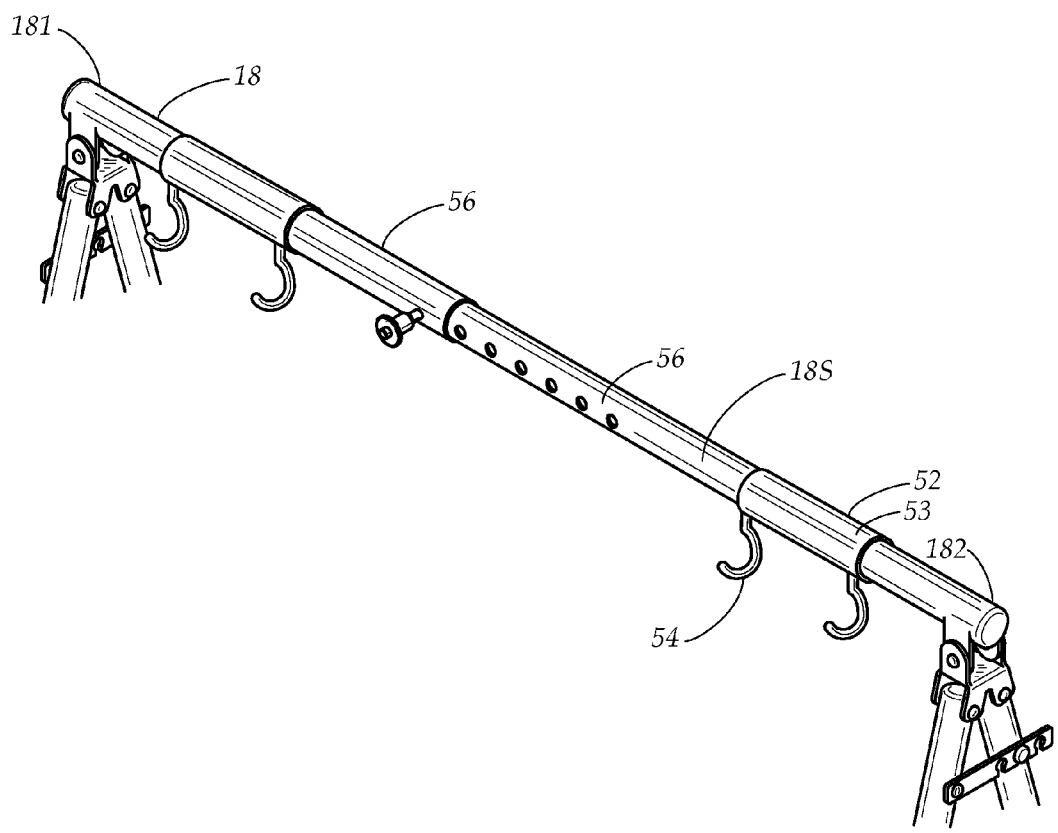
FIG. 5 is a perspective, enlarged view of a further example embodiment of an adjustable pull-up device including an adjustable bridge.

In an example embodiment, the bridge 18 has an outer surface 18S and at least two handle grips 52 coupled thereto, as illustrated in FIG. 5. The handle grips 52 extend between the hinges 14 and are preferably cylindrical in shape, extending concentrically around the bridge 18. The handle grips 52 are sufficiently narrow in width to enable the user to effectively hold the device 10 for use in fitness training. The handle grips 52 can include a cushioned surface 53 for protecting the user's hands while training using the device 10. In another example embodiment, the handle grips 52 can pivot around and/or along the length of the bridge 18. In a further example embodiment, the handle grips 52 are bands which are removably coupled to the bridge 18 and which define openings through which the user can insert a hand to engage the bridge 18, especially as a free weight. In yet a further example embodiment, the handle grips 52 are integrated into the structure of the bridge 18. In still a further example embodiment, a second pair of folding handles 64 are operably coupled to the bridge 18, one near the first end 181, and the other near the second end 182, such that the folding handles 64 extend outwardly and substantially perpendicularly to the length of the bridge 18 for use, as illustrated in FIG. 6, and can fold inwardly against the bridge. Additionally, the outwardly extending handles 64 can be pivotally coupled to the bridge 18 to enable the rotation of the folding handles 64 towards the bridge 18, such that they extend parallel to the bridge 18, for storage. Further, it is understood that the bridge 18 can include any or all combinations of the handles as described hereinabove.

Yet further, FIG. 5 illustrates an example embodiment of the bridge 18 which is variable in length. The bridge 18 includes a pair of telescoping members 56, wherein one member extends or retracts into the other when collapsing the device 10. The bridge 18 can be expanded and/or contracted using the methods described hereinabove with the expandable legs 16 of the device 10.

Still further, FIG. 5 illustrates an example embodiment of the bridge 18 including a plurality of band hooks 54 for coupling supplementary exercise equipment to the device 10, such as exercise bands. In an example embodiment, the hooks 54 are stationary. Accordingly, the hooks 54 and the bridge 18 can be unitary. In another example embodiment, the hooks 54 pivot around and/or along an axis extending along the length of the bridge 18. Accordingly, the hooks 54 can be operably coupled to the bridge 18 using fasteners, including but not limited to, rings, retainers, nails, screws, pins, hook and eye fasteners, glue, tape, and magnets. In a further example embodiment, the bridge 18 includes at least one track within which the hooks 54 can be positioned. The track extends at least partially around and/or along the length of the bridge 18. The rotation of the hooks 54 enables a user to direct a user's force using the supplementary exercise equipment in a wide array of orientations to the device 10 when fitness training.

Figure 3A:
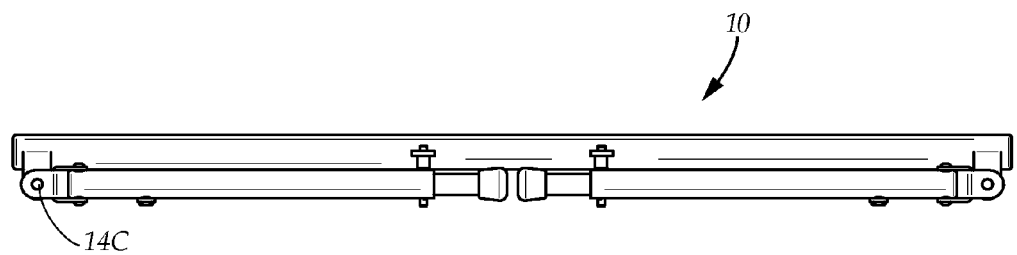
FIG. 3A is a front, elevational view of an example embodiment of an adjustable pull-up device in a collapsed position.
Figure 3B:
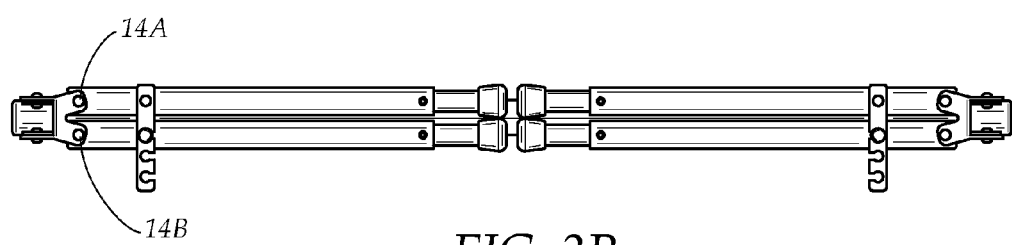
FIG. 3B is a bottom, planar view of an example embodiment of an adjustable pull-up device in a collapsed position.
Figure 3C:
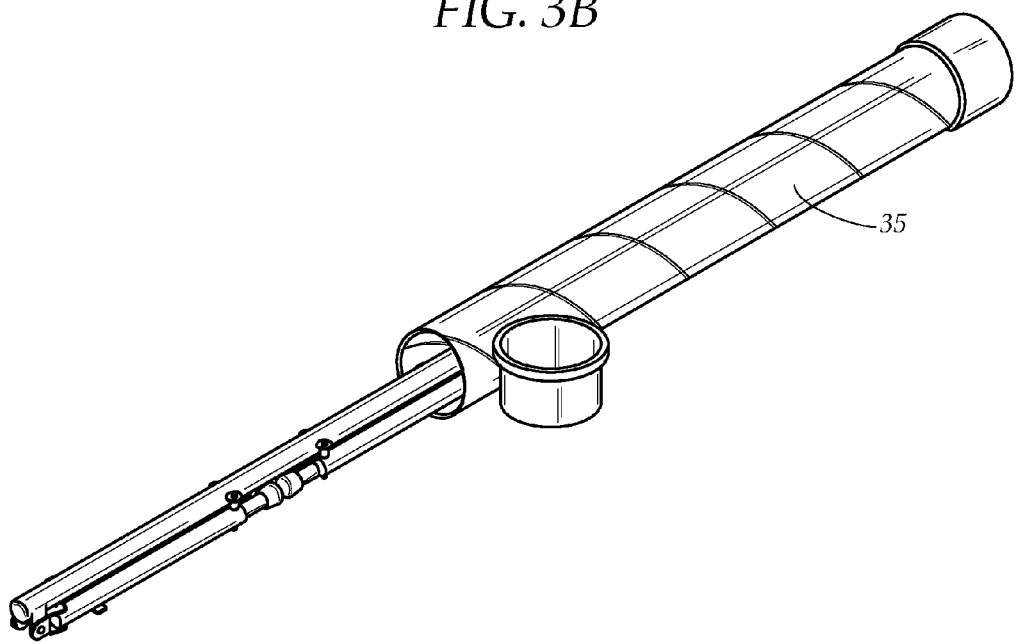
FIG. 3C is a perspective view of an example embodiment of an adjustable pull-up device within a storage container.

FIG. 3 illustrates an example embodiment of how the device 10 collapses for efficient storage of the device 10. After contracting the lower portion 16L of each leg 16 into the upper portion 16U of each leg 16, FIG. 3A illustrates how the legs 16 pivot inwardly around the third joints 14C of the hinges 14 towards a position adjacent or abutting the bridge 18. Further, FIG. 3B illustrates how the legs 16 pivot towards each other around the remaining joints 14A, 14B of the hinge 14. The retainer 20 can be operatively fastened to secure the device 10 in a collapsed position. It is understood that the steps for collapsing the device 10 discussed hereinabove can be performed in any order. Yet further, FIG. 3C illustrates how the pull-up device 10 can be stored within a container 35 including, but not limited to, a poster container, a gym bag, a purse, a backpack, and a carrying container.

Figure 7A:
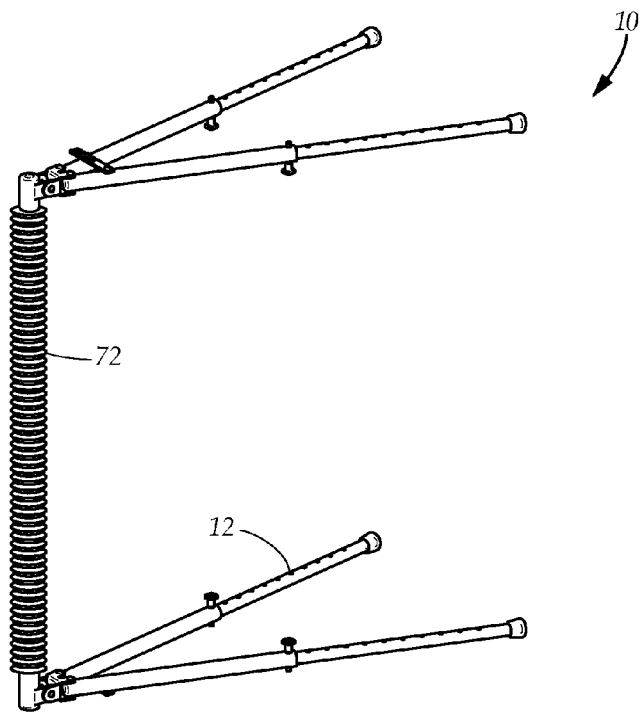
FIG. 7A is a perspective view of yet a further example embodiment of an adjustable pull-up device including an exercise band extending between the pair of legs.
Figure 7B:
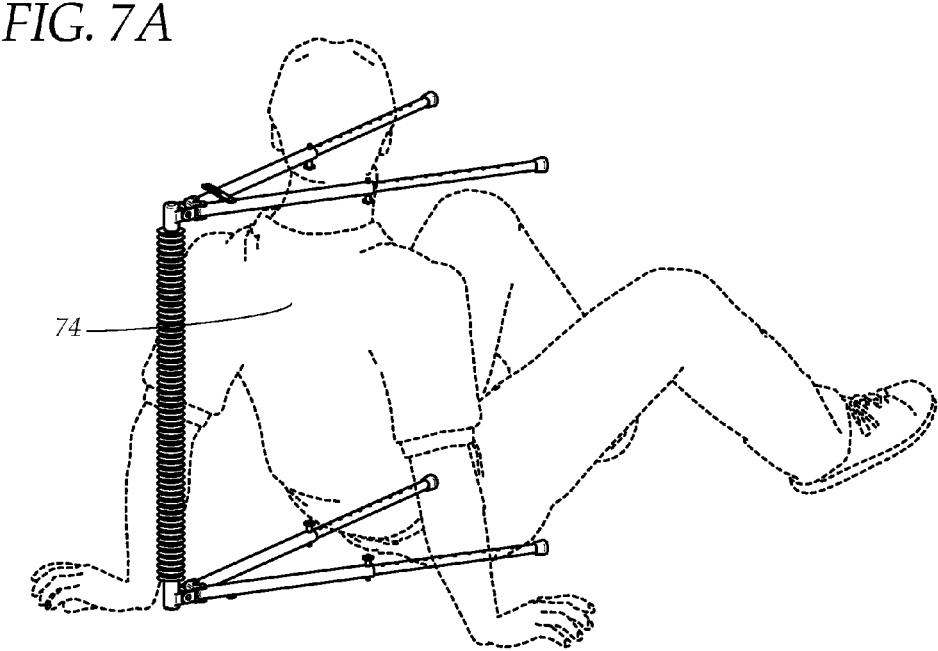
FIG. 7B is a perspective view of a user engaging the exercise band to perform a fitness exercise.

FIG. 7A illustrates still a further example embodiment of the pull-up device 10 including an exercise band 72 having a length and a pair of ends, each end operably coupled to a support mechanism 12, respectively, such that the length extends between each support mechanism 12. In an example embodiment, the band 72 is elastic. In FIG. 7A, the device 10 is deployed and rotated such that the band 72 extends substantially perpendicularly to a surface over which the device 10 is deployed. The band 72 enables use of the pull-up device 10 for upper body and core strength training, such as when a user performs core training exercises, such as crunches, with the band 72 positioned adjacent a user's back 74, as illustrated in FIG. 7B. The band 72 provides added resistance as a user performs the core training exercises.

Figure 8:
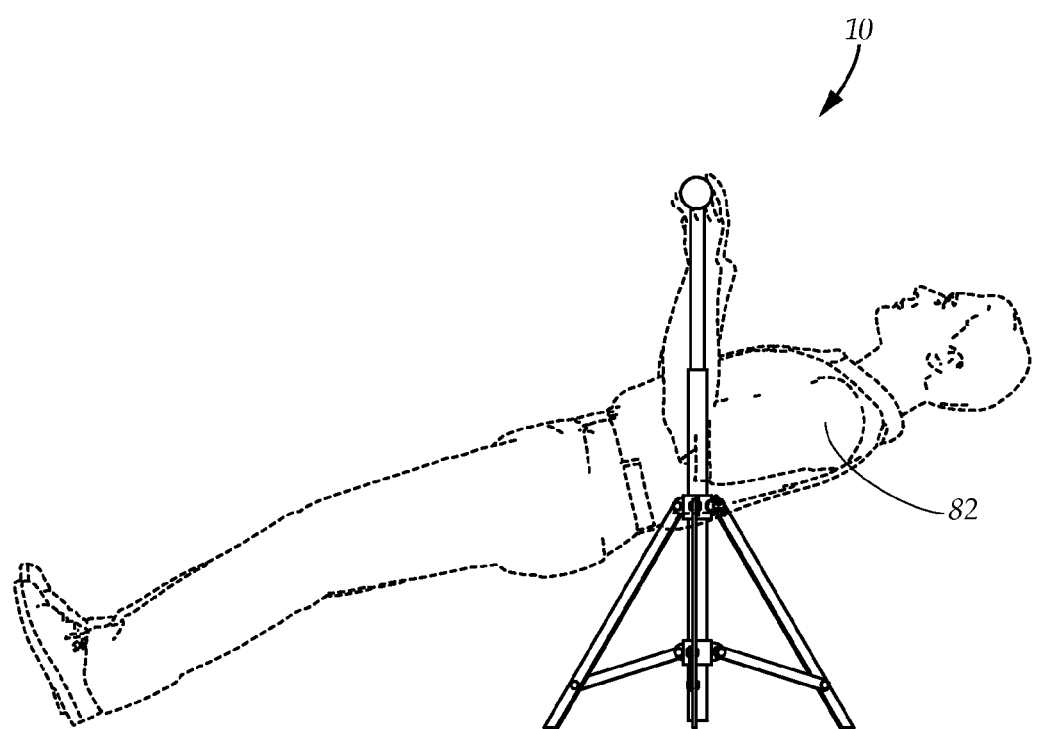
FIG. 8 is a side, elevational view of a user engaging an example embodiment of an adjustable pull-up device in an extended position to perform a pull-up.
Figure 9:
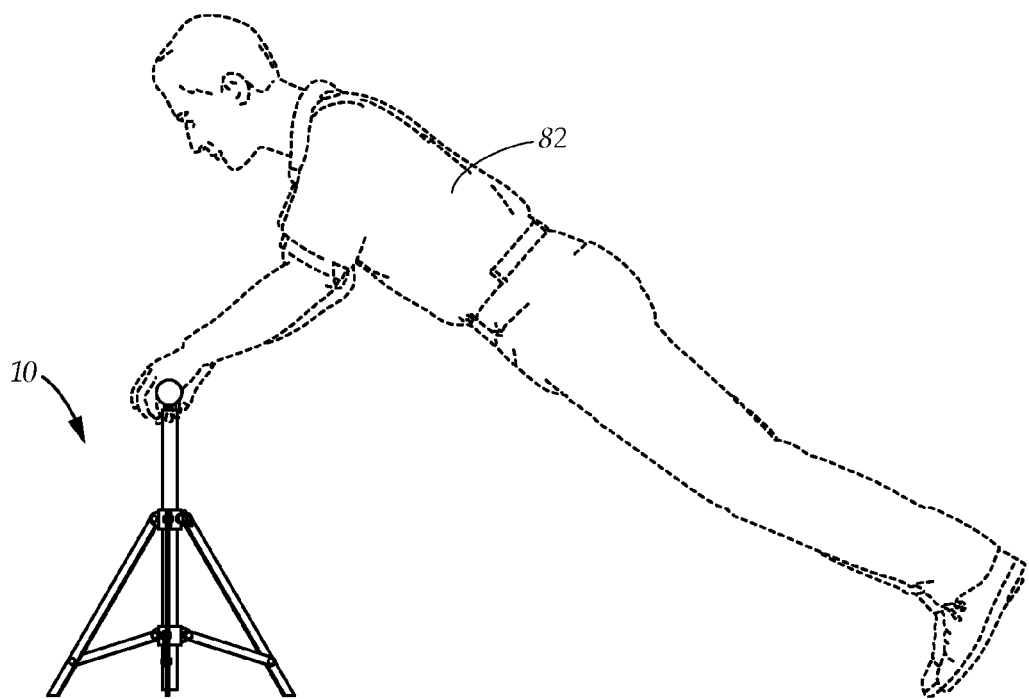
FIG. 9 is a side, elevational view of a user engaging an example embodiment of an adjustable pull-up device in a contracted position to perform a push-up.

Further example embodiments of how the pull-up device 10 can enable the performance of a comprehensive workout are illustrated in FIGS. 8-13. In FIG. 8, the support mechanisms 12 are expanded to a length sufficient for a user to position a user's body 82 underneath the bridge 18 and to engage the bridge with a lifting movement, such as a modified pull-up. FIG. 9 further illustrates how the user can contract the support mechanisms 12 to a length sufficient for the user to position the user's body 82 over the bridge 18 to engage the bridge 18 with a pushing movement, such as a modified push-up.

Figure 10A:
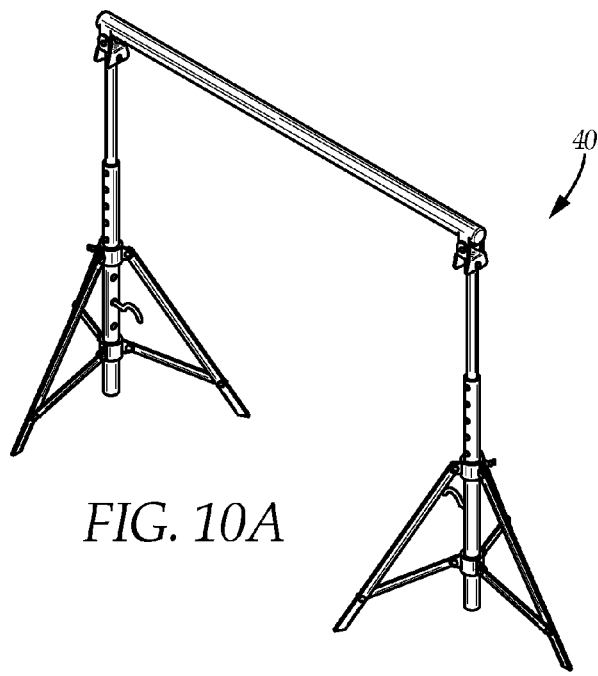
FIG. 10A is a perspective view of still a further example embodiment of an adjustable pull-up device including a pair of hooks coupled to the legs.
Figure 10B:
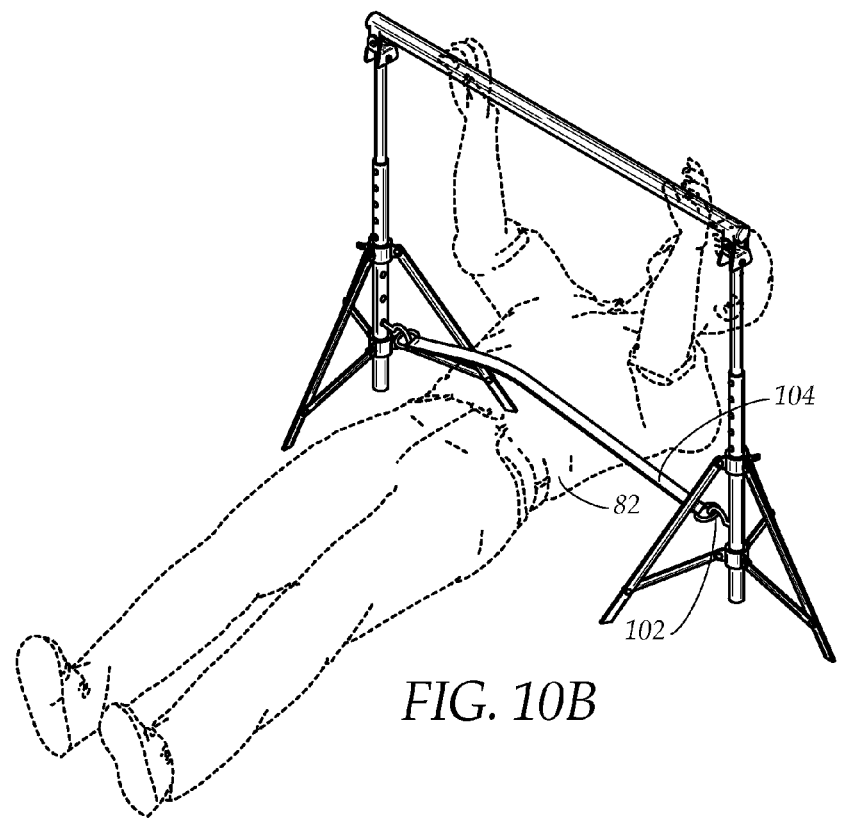
FIG. 10B is a perspective view of a user engaging the pair of hooks with an exercise band when performing a pull-up.

The user can combine upper body strength training using the pull-up device 10, 40 with core strength training. In an example embodiment, FIG. 10A illustrates how a pair of fasteners 102 can be coupled to the vertically aligned apertures 17 in the expandable legs 16 of the support mechanisms 12. The fasteners 102 can be oriented to enable use of the device 40 with supplementary exercise devices, such as exercise bands. For instance, FIG. 10B illustrates how an exercise band 104 is draped across the user's body 82 when coupled to the fasteners 102 for added resistance when the user performs a pull-up. Alternatively, the user can lie across and over the exercise band 104 such that the exercise band 104 assists in elevating the user's body 82 when the user performs a pull-up. Accordingly, the resistance provided by the band 104 can be augmented or reduced by coupling the band 104 lower or higher along the length of the legs 16, respectively.

Figure 14:
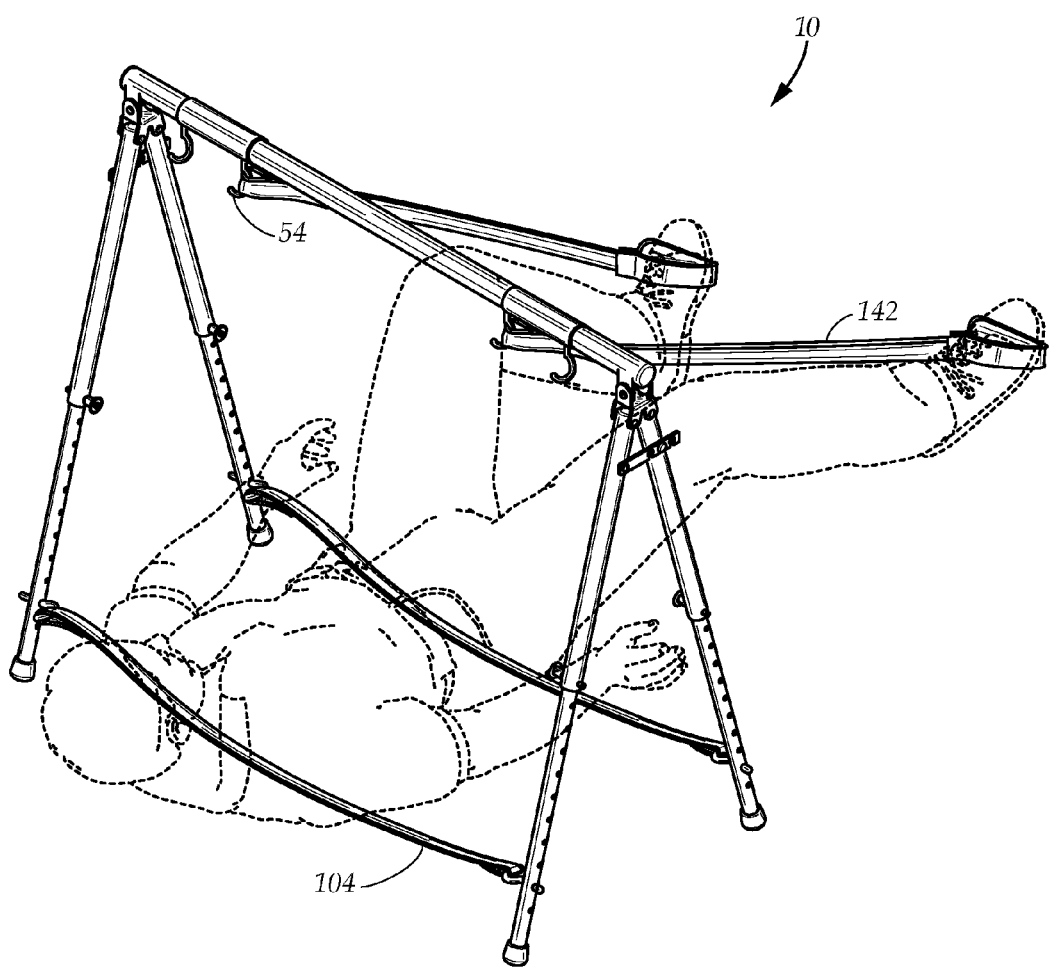
FIG. 14 is a perspective view of a user engaging a plurality of exercise bands extending outwardly from the pull-up device to perform lower body strength training exercises.

FIG. 14 illustrates how a user can engage the device 10 to perform lower body strength training exercises. In an example embodiment, the user can lie across a pair of exercise bands 104 coupled to each of the support mechanisms 12 via the fasteners 102 as described hereinabove, to stabilize the device 10 on a surface. The user then engages another pair of exercise bands 142 coupled to the plurality of attachment hooks 54 included within the bridge 18, and extending outwardly therefrom to perform lower body exercises, such as leg extensions.

Figure 13:
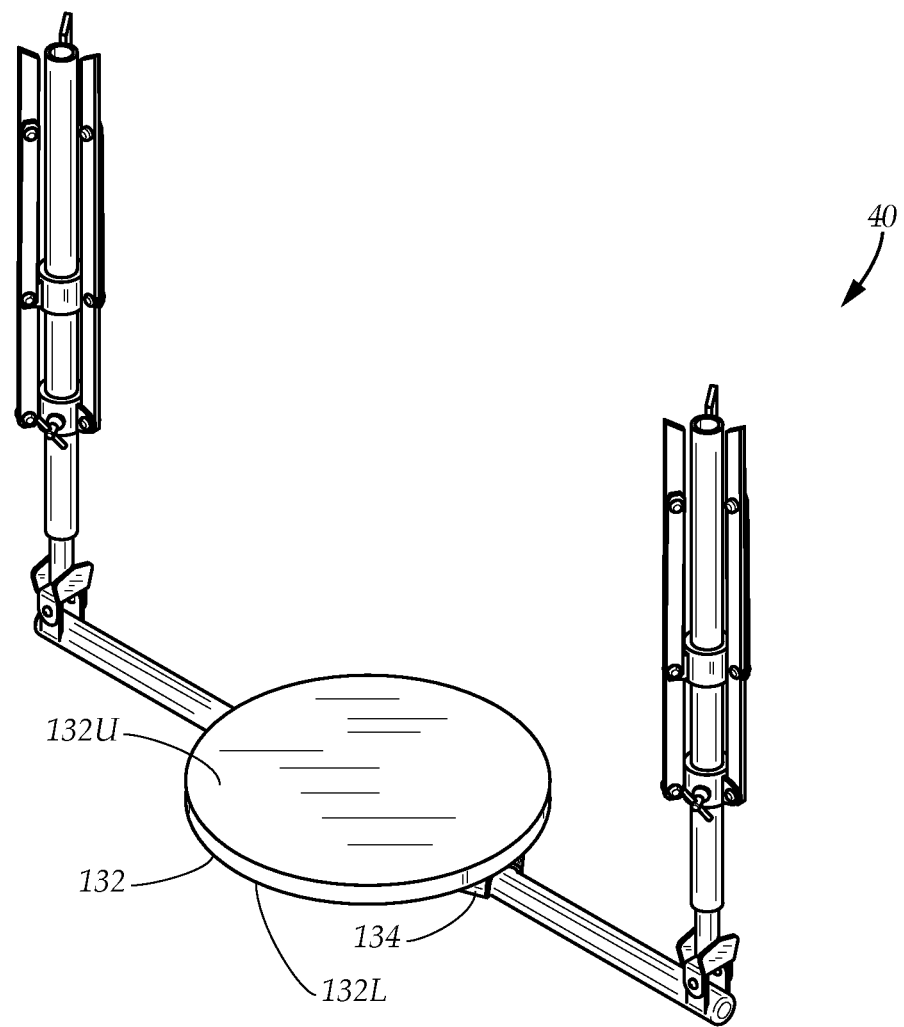
FIG. 13 is a perspective view of an example embodiment of an adjustable pull-up device in an inverted position and including a balancing device.

Further, in FIG. 13, a balancing trainer disk 132 is operably coupled to the bridge 13 to perform balancing, core, and lower body exercises, such as when the device 40 is inverted. In an example embodiment, the disk 13 includes an upper face 132U and an opposing lower face 132L through which the bridge 18 extends when coupled thereto. Alternatively, the disk 132 is coupled to the bridge 18 via a retainer 134. The retainer 134 can include a pivoting and/or ball joint around which the disk 132 pivots when a user balances on the upper face 132U. In another example embodiment, the disk 132 includes a semi-spherical upper face.

Figure 11:
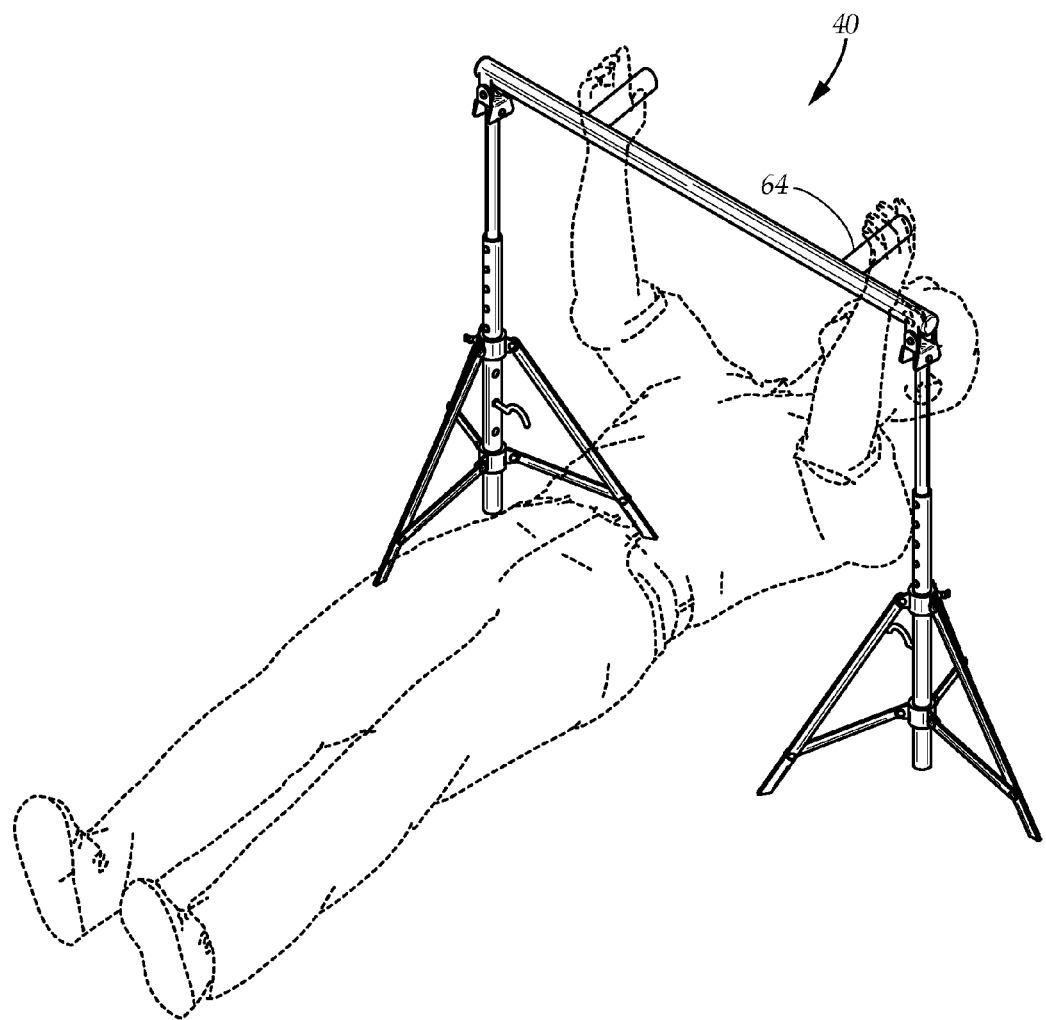
FIG. 11 is a perspective view of a user engaging the pivoting handles of an example embodiment of the adjustable pull-up device to perform a pull-up.
Figure 12:
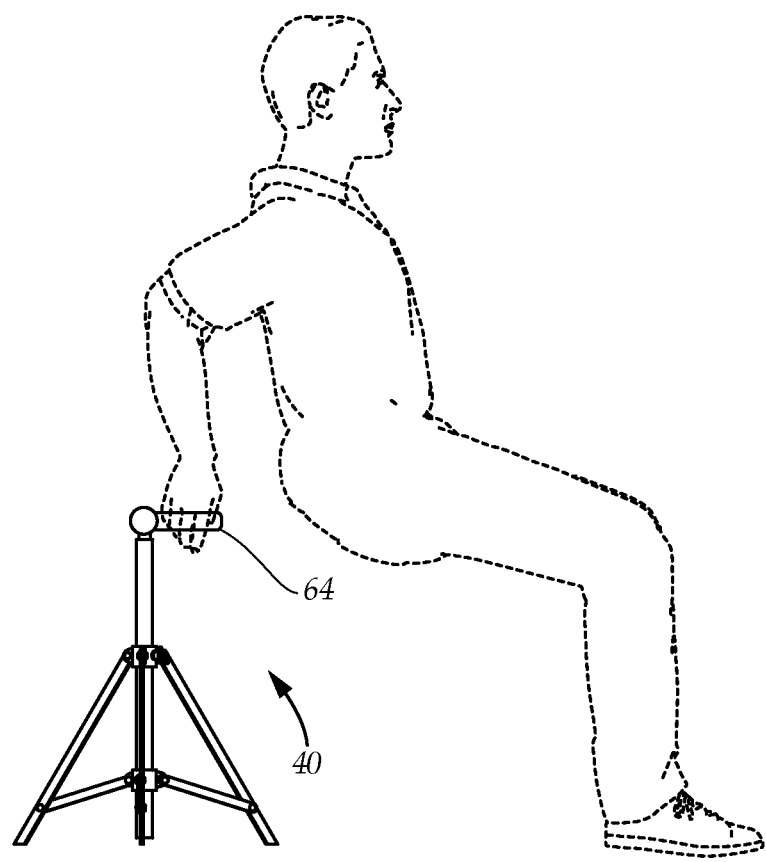
FIG. 12 is a side, elevational view of a user engaging the pivoting handles of an example embodiment of an adjustable pull-up device to perform a dip.

Yet further, the pull-up device 10,40 can be used to transition easily between a wide range of upper body strengthening exercises. FIG. 11 illustrates how the user can engage the handles 64 of the device 40 to perform both traditional and modified pull-ups, thereby targeting a wide range of core muscles. The user can then engage the handles 64 for performing variable upper body and core strengthening exercises, such as chair dips, as illustrated in FIG. 12. It is understood that use of the device 10 is not limited to those exercises described hereinabove.

Figure 15:
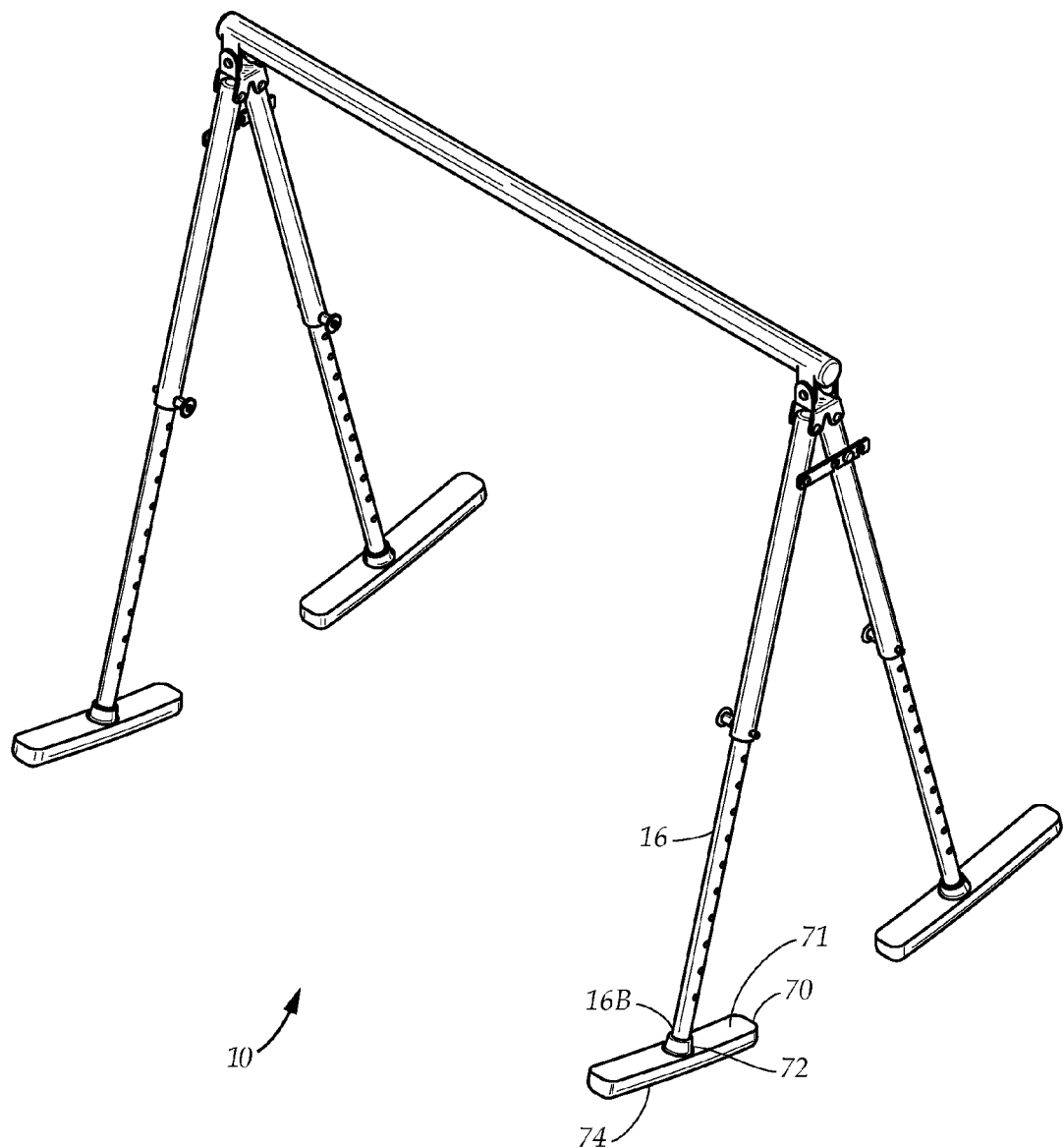
FIG. 15 is a perspective view, illustrating a further embodiment, wherein rocker rails are attached to the bottom of each of the extendable legs.
Figure 16A:
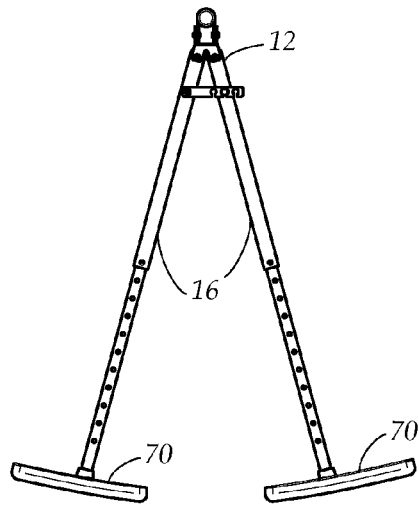
FIG. 16A is a side elevational view, illustrating the embodiment of FIG. 15.
Figure 16B:
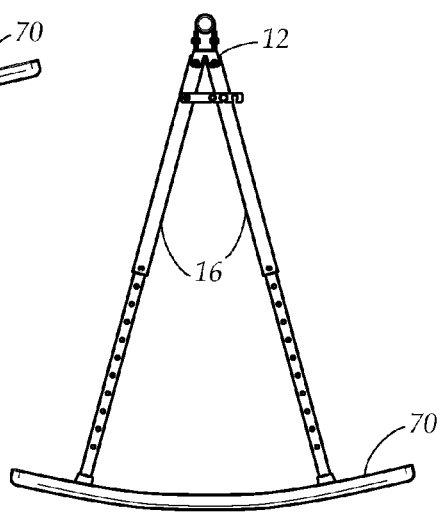
FIG. 16B is a side elevational view, illustrating yet a further embodiment, wherein one rocker rail is attached to the bottom of both extendable legs of one of the support mechanisms.
Figure 16C:
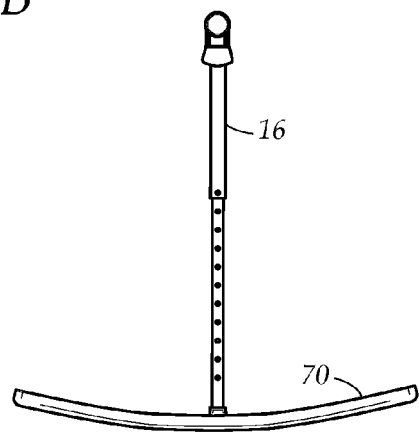
FIG. 16C is a side elevational view, illustrating a still further embodiment, wherein one rocker rail is attached to a single extendable leg of one of the support mechanisms, the rocker rail providing a stable base for the device.

FIG. 15 illustrates a further embodiment of the pull-up device 10. In particular, each expandable leg 16 has a leg bottom 16B. A rocker rail 70 is attached to each leg bottom 16B. Note that the rocker rails 70 may be detachable to facilitate compact folding of the pull-up device 10 for storage. Each rocker rail 70 includes an upper surface 71, including a socket 72. The socket 72 is attached to the leg bottom 16B. The rocker rail 70 also includes a lower surface 74, which is convex to facilitate a rocking movement when a balance limit of the device 10 is reached, such that without the rocker rails 70, the device 10 would otherwise begin to tip over. Instead, the rocker rail 70 allows the device 10 to begin to roll over on the convex lower surface 74 of the rocker rail 70. The rocker rails 70 extend parallel to each other. Note that the rocker rail 70 may be adapted to the different embodiments illustrated herein. In particular, FIG. 16A shows an embodiment having two legs 16 that radiate from one of the support mechanisms 12, with each leg having one of the rocker rails 70. FIG. 16B, however, shows an embodiment having two legs 16, where both legs 16 are secured to a single, elongated rocker rail 70. The rocker rail 70 extends between and beyond the extendable legs 16 associated with one of the support mechanisms 12. Further, FIG. 16C shows an embodiment having a single leg 16 radiating from the support mechanism 12, wherein the leg is secure to a single elongated rocker rail 70, which thereby provides a base with significant stability for the user.

Figure 17:
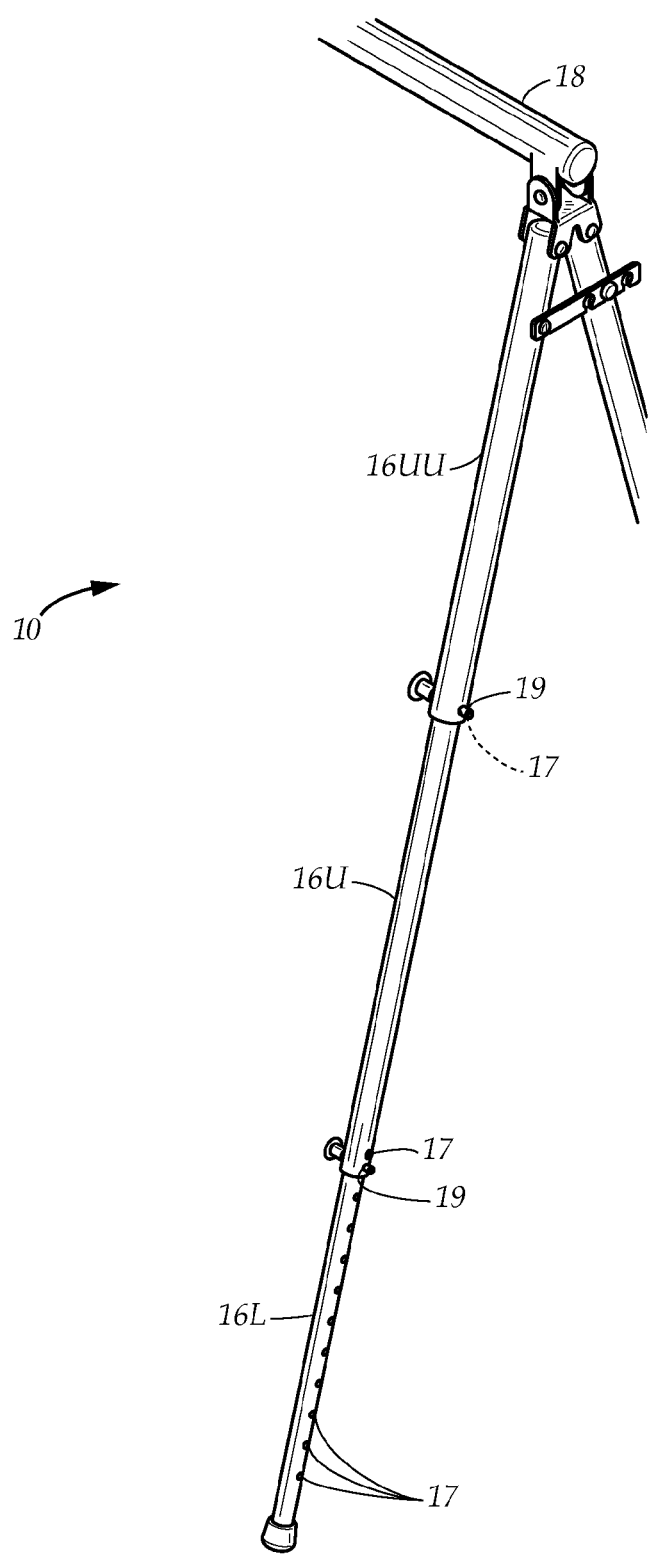
FIG. 17 is a perspective view with parts broken away, showing a further embodiment of the extendable leg, with further telescoping capabilities.

FIG. 17 illustrates a still further embodiment where the legs 16 have enhanced expandability. In particular, in addition to the already telescoping lower portion and upper portion, the leg 16 has an uppermost portion 17UU. The Upper portion selectively telescopes within the uppermost portion 17UU, just as the lower portion telescopes within the upper portion. While the lower portion and upper portion allow fine adjustment, however, the upper and uppermost portions together only provide a single, height adjustment in a large increment. In particular, extending the upper portion from the uppermost portion provides a large increase in height of the bridge 18, and retracting the upper portion into the uppermost portion provides a large decrease in height of the bridge 18. In particular, the upper portion 16U selectively extends to an expanded position nearly fully extended from the uppermost portion 16UU with a single movement. By having only two inside apertures 17 (one of which is indicated by hidden lines in FIG. 17) on the upper portion 16U at the extreme ends of its range of movement, the upper portion 16U has a single, alternatively retracted position, where the upper portion 16U is nearly fully within the uppermost portion 16UU, and a single extended position where the upper portion 16U is nearly fully extended from the uppermost portion 16UU. This allows a quick increase in height of the bridge 18. Note that the lower portion 16L extends within the upper portion, and can be fixed at multiple positions relative thereto using the plurality of inner apertures 17 in the lower portion to allow fine height adjustment of the bridge. For example, this arrangement will allow a user to quickly select between largely distinct height settings, for example, one foot, two foot, and three feet height settings. Then, using the apertures 17 in the lower segment 16L, the user can make fine adjustments to the precise height desired.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an adjustable pull-up device. The disclosure is illustrated by example in the drawing figures, and throughout the written description. It should be understood that numerous variations are possible, while adhering to the inventive concept. Such variations are contemplated as being a part of the present disclosure.

What is claimed is:

1. An adjustable pull-up bar, comprising:
a bridge, the bridge is a cylindrical bar having a pair of ends;
a pair of support mechanisms, the bridge extending between the support mechanisms with each support mechanism attached at one of the ends of the bridge, each support mechanism having a pair of expandable legs, the legs each hingedly attached to the bridge so that each leg is configured to fold up against the bridge, and hingedly attached to each other so that they are configured to selectively extend parallel to each other and selectively extend in an inverted V-shape with respect to each other to support the bridge to extend horizontally over a horizontal surface, each leg having a length, an upper portion, and a lower portion, the lower portion of each leg includes a plurality of vertically aligned apertures, the upper portion includes at least one aperture, the lower portion apertures are configured for alignment with the at least one aperture in the upper portion of the legs, a fastener is operatively inserted through the aligned apertures for securing the leg in an expanded or a retracted position wherein the legs are telescoping such that at least one of the upper portion and the lower portion contract into the other to shorten the leg, each expandable leg has a bottom end, and has a rocker rail attached to said bottom end, the rocker rail has a convex lower surface; and an exercise band having a pair of hooks, one of the hooks of the pair of hooks attached in one of the apertures of one of the expandable legs of one of the support mechanisms, the other hook of the pair of hooks attached in one of the apertures of one of the expandable legs of the other of the support mechanisms.

2. The adjustable pull-up bar as recited in claim 1, further comprising a pair of handgrips, the hand grips extending concentrically upon the bridge.

3. The adjustable pull-up bar as recited in claim 2, further comprising at least one hook attached to each of the hand grips, each hook adapted for attaching a resistance band.

4. The adjustable pull-up bar as recited in claim 3, each expandable leg further comprising an uppermost portion, the upper portion telescoping within the uppermost portion, the upper portion selectively extending to an expanded position nearly fully extended from the uppermost portion with and to a retracted position nearly fully within the uppermost portion, the lower portion extending within the upper portion, the plurality of apertures in the lower portion allowing fine height adjustment of the bridge.

5. The adjustable pull-up bar as recited in claim 4, further comprising a pair of weights, each of the weights attached to one of the ends of the bridge.

\* \* \* \* \*